United States Patent
Kaneko et al.

(10) Patent No.: US 10,087,557 B2
(45) Date of Patent: Oct. 2, 2018

(54) METHOD FOR PRODUCING CARBON NANOFIBERS

(71) Applicant: Denka Company Limited, Tokyo (JP)

(72) Inventors: Hitoshi Kaneko, Tokyo (JP); Toru Arai, Tokyo (JP); Yoko Horikoshi, Tokyo (JP); Ayumu Tsukamoto, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 15/748,350

(22) PCT Filed: Jul. 25, 2016

(86) PCT No.: PCT/JP2016/071783
§ 371 (c)(1),
(2) Date: Jan. 29, 2018

(87) PCT Pub. No.: WO2017/022553
PCT Pub. Date: Feb. 9, 2017

(65) Prior Publication Data
US 2018/0216255 A1 Aug. 2, 2018

(30) Foreign Application Priority Data
Jul. 31, 2015 (JP) .................. 2015-151573

(51) Int. Cl.
*D01F 9/127* (2006.01)
*B01J 35/10* (2006.01)
(Continued)

(52) U.S. Cl.
CPC .............. *D01F 9/127* (2013.01); *B01J 23/75* (2013.01); *B01J 35/10* (2013.01); *C01B 32/168* (2017.08); *B82Y 40/00* (2013.01); *C01B 2202/06* (2013.01)

(58) Field of Classification Search
None
See application file for complete search history.

(56) References Cited

U.S. PATENT DOCUMENTS

| | | | |
|---|---|---|---|
| 2010/0266478 A1 | 10/2010 | Kim et al. | |
| 2011/0003151 A1* | 1/2011 | Nishio | B01J 23/005 428/367 |
| 2014/0329093 A1 | 11/2014 | Nishio et al. | |

FOREIGN PATENT DOCUMENTS

| | | |
|---|---|---|
| JP | 2004299986 A | 10/2004 |
| JP | 2004300631 A | 10/2004 |

(Continued)

OTHER PUBLICATIONS

English language abstract for JP 2004299986 A (2004).
(Continued)

*Primary Examiner* — Daniel McCracken
(74) *Attorney, Agent, or Firm* — Caesar Rivise, PC (57) ABSTRACT

Provided is a method for producing carbon nanofibers having excellent conductivity, crystallinity and dispersibility. A method for producing carbon nanofibers, which uses an activated species mainly composed of cobalt as a catalyst, while using carbon monoxide as a carbon source. The catalyst is obtained by having a carrier, which is composed of an oxide having a specific surface area of 0.01-5 m$^2$/g and containing magnesium, support 3-90% by mass of the activated species. By controlling the reaction temperature, the carbon monoxide partial pressure and the gas flow rate of the carbon monoxide, CNF having more excellent conductivity, crystallinity and dispersibility can be produced, thereby obtaining carbon nanofibers having excellent conductivity, crystallinity and dispersibility.

4 Claims, 3 Drawing Sheets

(51) Int. Cl.
*C01B 32/168* (2017.01)
*B01J 23/75* (2006.01)
*B82Y 40/00* (2011.01)

(56) References Cited

FOREIGN PATENT DOCUMENTS

| | | | |
|---|---|---|---|
| JP | 2006152490 | A | 6/2006 |
| JP | 2007015914 | A | 1/2007 |
| JP | 2008173608 | A | 7/2008 |
| JP | 2010137222 | A | 6/2010 |
| JP | 2011074556 | A | 4/2011 |
| JP | 2014208328 | A | 11/2014 |
| WO | 2009110570 | A1 | 9/2009 |
| WO | 2012053334 | A1 | 4/2012 |

OTHER PUBLICATIONS

English language abstract for JP 2004300631 A (2004).
English language abstract for JP 2006152490 A (2006).
English language abstract for JP 2007015914 A (2007).
English language abstract for JP 2008173608 A (2008).
English language abstract for JP 2011074556 A (2011).
English language abstract for JP 2014208328 A (2014).
International Search Report from corresponding PCT/JP2016/071783 dated Aug. 30, 2016.
International Preliminary Report on Patentability from PCT/JP2016/071783 dated Feb. 15, 2018.

\* cited by examiner

Cross-sectional view along line A-A'

METHOD FOR PRODUCING CARBON NANOFIBERS

CROSS-REFERENCE TO RELATED APPLICATIONS

This application is the U.S. National Phase Application of PCT/JP2016/071783, filed Jul. 25, 2016, which claims priority from JP 2015-151573, filed Jul. 31, 2015, the contents of which applications are incorporated herein by reference in their entireties for all purposes.

TECHNICAL FIELD

The present invention relates to a process for producing carbon nanofibers, the process using a catalyst comprising a certain amount of an active species based on cobalt and a carrier supporting the active species, wherein the carrier comprises an oxide having a certain specific surface area and containing magnesium, wherein the process uses carbon monoxide as a carbon source, wherein the process produces carbon nanofibers with using a certain flow rate of carbon monoxide gas at a certain temperature range.

BACKGROUND ART

Conductive carbon materials, such as acetylene black, carbon nanofibers (hereinafter referred to as "CNF") and mixtures thereof, have been used as a filler for imparting conductivity to resins, or a conductive additive for electrodes of various batteries, particularly lithium ion batteries. In particular, CNF is one of the most promising of the conductive carbon materials since a relatively small amount of CNF can impart great conductivity to a target. CNFs have a fibrous shape, and generally have 5 to 100 nm of the outer diameter and 10 or more of the aspect ratio. Note that the aspect ratio means the ratio of the length to the outer diameter of fiber.

CNFs have been manufactured by various processes such as arc discharge method, catalytic chemical vapor deposition method, and laser ablation method. Among them, the catalytic chemical vapor deposition method would be the most preferred as an industrial manufacturing process. The catalytic chemical vapor deposition method uses transition metal particles as a catalyst, and contacts the catalyst with a source gas which is the carbon source, such as acetylene and benzene gas, to grow CNF from the catalyst particles at a high temperature, e.g., 900 degrees C. or more in general. It has been focused on a process for producing CNF from a source gas composed mainly of carbon monoxide using a transition metal ingredient such as cobalt as a catalyst since the process is considered to be able to produce CNF with high purity and quality at a relatively low temperature (see Patent Documents 1 to 5).

CITATION LIST

Patent Literature

Patent Document 1: Japanese Patent Application Laid-open Publication No. 2004-299986 A
Patent Document 2: Japanese Patent Application Laid-open Publication No. 2004-300631 A
Patent Document 3: Japanese Patent Application Laid-open Publication No. 2006-152490 A
Patent Document 4: Re-publication of PCT International Publication WO 2009/110570 A1
Patent Document 5: Re-publication of PCT International Publication WO 2012/053334 A1

SUMMARY OF INVENTION

Technical Problem

The conventional art disclosed in the Patent Documents above, however, has certain drawbacks that the CNF obtained has too low conductivity (i.e., too high volume resistivity) as a conductive material or conductive additive. There is still room for improvement in the conventional CNFs.

Further, if a CNF is used as a filler for imparting conductivity to a matrix such as resin, or as a conductive additive for electrodes of lithium ion batteries, it is important to consider dispersibility of the CNF. The conventional CNFs, however, have poor dispersibility since the fine carbon fibers of the CNFs entangle with each other to form a secondary structure. Using the conventional CNFs have thus required mechanical dispersion e.g., by jet mills, ball mills, or ultrasonic homogenizers, or chemical dispersion e.g., by oxidizing with nitric acid or the like. The dispersion processes often need a cost higher than the price of CNF, and have certain economic disadvantages. The dispersion processes also have drawbacks that the processes are too harsh such that CNFs would break and oxidize to impair their conductivity.

The present invention struggles with the above problems and situations, and aims to provide a process for producing a CNF excellent in crystallinity, conductivity, and dispersibility.

Solution to Problem

The present invention can provide the following aspects of a process for producing a carbon nanofiber.

1. A process for producing a carbon nanofiber, the process using a catalyst comprising an active species based on cobalt and a carrier supporting the active species thereon, wherein the carrier comprises an oxide having a specific surface area of 0.01 to 5 $m^2/g$ and containing magnesium,
   wherein the process uses carbon monoxide as a carbon source,
   wherein a partial pressure for carbon monoxide is 0.04 to 0.98 MPa,
   wherein a flow rate for carbon monoxide gas is equal to 0.1[NL/{(grams of active species)·minute}] or more and less than 6[NL/{(grams of active species)·minute}], and
   wherein a reaction temperature is equal to 570° C. or more and less than 670° C.

2. The process according to Aspect 1 above, wherein the amount of the active species supported on the carrier is 3 to 90% by mass on the basis of the mass of the carrier.

3. The process according to Aspect 1 or 2 above, wherein the produced carbon nanofiber has at least one of the following physical properties:
   0.05Ω·cm or less of a volume resistivity measured under a load of 9.8 MPa;
   0.5 to 1.5 of D/G;
   50 volume % or more of particles, as dispersed in water, having a size of 1 µm or less; and
   3 µm or less of median diameter D50 as dispersed in water.

Advantageous Effects of Invention

According to the present invention, a process for producing CNF can be provided. For manufacturing CNF using carbon monoxide as the carbon source, the process utilizes a catalyst comprising an active species based on cobalt and a carrier supporting the active species, wherein the carrier comprises an oxide having a specific surface area of 0.01 to 5 $m^2/g$ and containing magnesium. The process can therefore produce CNF having high crystallinity, excellent conductivity, and great dispersibility.

DESCRIPTION OF EMBODIMENTS

Definitions of Terms

In the present specification, the term "CNF" means fibers having 5 to 100 nm of the outer diameter and 10 or more of the aspect ratio (i.e., the ratio of the length to the outer diameter of fiber), and also embraces Multi-Walled Carbon NanoTubes (MWCNTs). In an embodiment, CNFs may preferably be, but not limited to, those based on MWCNTs, more preferably those of MWCNTs.

The fiber length (length of fiber) for a CNF means the length of CNF to be measured. If the CNF has bent, the length is measured along the bent shape of tube.

Note that, in the present specification, CNFs do not include Single-Walled Carbon NanoTubes (SWCNTs). Although SWCNTs have high conductivity, they are inadequate for the aim of present invention in practice since they include chiral enantiomers and have a bundle structure.

The term "synthetic activity" means, in the context of the present invention, the mass of CNF obtained per unit mass of active species and per unit time. The term "catalytic activity" means, in the context of the present invention, the mass of CNF obtained per unit mass of catalyst and per unit time. The term "active species" means a metal composed mainly of or based on cobalt. The term "carrier" means an oxide to support the active species.

In the present specification, the sign "~" (tilde; translated to the word "to" or "through" in English) means a range from one of the limits to the other of the limits, i.e., the range includes the lower and upper limits. For instance, "A to B" means a value in the range which is equal to or more than "A" and is equal to or less than "B."

Embodiments of the Present Invention are Described in Detail Below. According to an embodiment, a process for producing carbon nanofibers uses using a catalyst comprising an active species based on cobalt and a carrier supporting the active species, wherein the carrier comprises an oxide having a specific surface area of 0.01 to 5 $m^2/g$ and containing magnesium. The process also uses carbon monoxide as a carbon source, and the reaction temperature equal to 570 degrees C. (° C.) or more and less than 670 degrees C. In the process, the partial pressure for carbon monoxide is 0.04 to 0.98 M Pa, and the flow rate for carbon monoxide gas is equal to 0.1 [NL/{(grams of active species)·minute}] or more and less than 6 [NL/{(grams of active species)·minute}].

Active Species

In an embodiment of the present invention, a process for producing carbon nanofibers uses a catalyst in which an active species based on cobalt mounts on an oxide containing magnesium. Hereinafter, the catalyst is abbreviated to "magnesium oxide-supported cobalt catalyst." The cobalt (ingredient) may include not only metallic cobalt but cobalt in the form of various compounds such as oxides, hydroxides, hydrous oxides, nitrates, acetates, oxalates, and carbonates.

The active species may further include the element(s) of Groups 4 to 12 other than cobalt, such as those of iron group (e.g., iron and nickel), manganese, and molybdenum. The elements of Groups 4 to 12 contained in the active species of the catalyst may include, but not limited to, 60 mol % or more, preferably 80 mol % or more, the most preferably 90 mol % or more of a cobalt ingredient. The active species may further include an element(s) of Groups 1 to 3 or Group 14 as an ingredient other than the elements of Groups 4 to 12. In the present specification, the active species based on cobalt is often abbreviated to "cobalt active species."

Carriers

Carriers to be mount by the active species comprise an oxide having a specific surface area of 0.01 to 5 $m^2/g$ and containing magnesium. Note that the term "oxide" embraces complex oxides. Oxides containing magnesium may include, but not limited to, magnesium oxide, and spinel or perovskite oxides containing magnesium. Among them magnesium oxide is the most preferred as the carrier.

The oxide containing magnesium may preferably have the specific surface area of 0.03 to 4 $m^2/g$, more preferably 0.05 to 3 $m^2/g$. If the specific surface area is less than 0.01 $m^2/g$, the resulted CNF may have poor crystallinity and conductivity. If the specific surface area is more than 5 $m^2/g$, the resulted CNF may have poor dispersibility. The carrier may further include an oxide of metal(s) selected from Groups 1 to 3 and Group 14. The amount of the oxide containing magnesium in the carrier may preferably be 50% by mass or more, more preferably 90% by mass or more, and the most preferably 98% by mass or more, given that the mass of the carrier defines 100%. If the amount of the oxide containing magnesium is 50% by mass or more, deterioration of the synthetic activity can be suppressed.

The rate of cobalt active species supported on the carrier ("carrying rate") may preferably be 3 to 90% by mass, the most preferably 5 to 80% by mass. If the carrying rate is less than 3% by mass, the resulted CNFs may have poor crystallinity and conductivity. If the carrying rate is more than 90% by mass, the resulted CNFs may have poor dispersibility. The carrying rate can be calculated as:

Carrying rate (%)={(the mass of cobalt)/(the mass of carrier)}* 100

The cobalt active species may be supported on the carrier in any manner. For instance, a cobalt active species may be supported on a carrier by immersing the carrier in a non-aqueous solution such as ethanol solution or an aqueous solution of cobalt salt or a mixture thereof; mixing and dispersing the carrier in the solution and then removing the solvent and drying over the residue; and heating the residue at a high temperature such as 300 to 600 degrees C.

Alternatively, the supporting process may only comprise the steps of immersing a carrier in a non-aqueous solution such as ethanol solution or an aqueous solution of cobalt salt or a mixture thereof; mixing and dispersing the carrier in the solution; and removing the solvent and drying over the residue.

Manufacturing Processes and Conditions for CNFs

The process for manufacturing CNFs according to an embodiment of the present invention utilizes carbon monoxide as a carbon source. The carbon monoxide used for a carbon source may be a mixed gas of carbon dioxide and carbon monoxide, or may contain an inert gas such as nitrogen. In the case that the carbon monoxide is supplied in the form of a mixed gas with carbon dioxide, the amount of carbon monoxide may, but not limited to, 80 mol % or more, preferably 90 mol % or more, and more preferably almost 100 mol %. Of course, carbon monoxide gas without carbon dioxide may also preferably work.

The process for producing CNFs according to an embodiment may preferably use carbon monoxide combined with hydrogen. In other words, the present process uses a source gas containing carbon monoxide, preferably containing carbon monoxide and hydrogen. The source gas may further include some inert gas such as nitrogen gas. The source gas may further include other some ingredients. The partial pressure of carbon monoxide is in the range of 0.04 to 0.98 MPa, preferably 0.05 to 0.3 MPa, more preferably 0.05 to 0.1 MPa.

If the partial pressure of carbon monoxide is less than 0.04 MPa, the synthetic activity may decrease and the resulted CNFs may have poor crystallinity and conductivity. If the partial pressure of carbon monoxide is more than 0.98 MPa, the resulted CNFs may have poor dispersibility, and the catalyst may be swiftly deactivated such that the synthetic activity may decrease.

If the source gas contains only carbon monoxide, the value of partial pressure of carbon monoxide shall mean the whole pressure of source gas.

The partial pressure of hydrogen may preferably be 1 to 100%, more preferably 10 to 100%, with respect to that of carbon monoxide. If the partial pressure of hydrogen is more than 100% with respect to that of carbon monoxide, the synthetic activity may decrease and the resulted CNFs may have poor crystallinity and conductivity. If the partial pressure of hydrogen is less than 1%, the catalyst may deactivate too early and the synthetic activity may decrease, and the resulted CNFs may have poor dispersibility, The ratio of the partial pressure of hydrogen to that of carbon monoxide is calculated as:

The ratio of the partial pressure of hydrogen to that of carbon monoxide (%)={(mole fraction of hydrogen)/(mole fraction of carbon monoxide)}*100

For instance, given that the raw material composition contains $CO:H_2:N_2=85:15:0$, as shown in Table 1. Then the partial pressure of hydrogen with respect to that of carbon monoxide is calculated as (15/85)*100=18%.

The process for producing CNFs according to an embodiment may set any total pressure for the source gas. The source gas may preferably have the total pressure of 0.98 MPa or less. If the total gas pressure is more than 0.98 MPa, the production system has to manage a high pressure and will probably require high costs for facilities and utilities. If the total gas pressure is less than 0.1 MPa (i.e., atmospheric pressure), such as less than 0.08 MPa, it may be difficult to seal the reactor at a high temperature to keep out ambient air or oxygen.

Prior to the reaction, the process may include a reducing step for the catalyst using hydrogen or other reducible gas. The hydrogen or other reducible gas may be diluted with an inert gas such as nitrogen in any manner. The reduction of catalyst may preferably occur at the same temperature as the reaction temperature or at a temperature in the range of the reaction temperature ±200 degrees C. The reduction of catalyst prior to the reaction may increase or stabilize the catalytic activity.

The process for producing CNFs according to an embodiment may adopt a flow rate for carbon monoxide gas which is equal to 0.1 [NL/{(grams of active species)·minute}] or more and less than 6 [NL/{(grams of active species)·minute}], more preferably 0.3 [NL/{(grams of active species)·minute}] or more and less than 5 [NL/{(grams of active species)·minute}], and the most preferably 0.3 [NL/{(grams of active species)·minute}] or more and less than 4 [NL/{(grams of active species)·minute}]. If the flow rate for carbon monoxide gas is in the ranges above, the process can produce CNFs that have excellent dispersibility. The phrase "excellent dispersibility" may mean, in the present specification, that 50 volume % or more of particles dispersed into water has the size of 1 μm or less, or the median diameter D50 is 3 μm or less. If the flow rate for carbon monoxide gas is less than the range above, the activity may decrease. If the flow rate is higher than the range above, the produced CNFs may have poor dispersibility.

In the present specification, the term "NL" means the amount of gas in liter (L) corrected for normal state (at 0 degree C. and 1 atm). In the present specification, the unit "NL/{(grams of active species)·minute}" means the flow rate of gas per minute in the presence of unit active species (i.e., per 1 grams of active species).

According to an embodiment of the present invention, a process for producing CNFs utilizes the reaction temperature that is equal to or more than 570 degrees C. and less than 670 degrees C. The reaction temperature may preferably be 600 to 660 degrees C. If the reaction temperature is less than 570 degrees C., the CNF may have poor crystallinity, conductivity, and dispersibility. If the reaction temperature is 670 degrees C. or more, the synthetic activity may decrease.

According to the present embodiments, a process for producing CNFs may adopt some conventional manufacturing methods or manufacturing apparatuses. For instance, the process may use apparatuses such as fixed bed reactors, fluidized bed reactors, reaction devices capable of mechanical stirring, batch reactors, and continuous reactors. The reaction devices capable of mechanical stirring may include some devices having a stirring blade or a paddle as moving parts, and some self-rotatable devices like rotary kilns.

In the cases of using fluidized bed reactors or reaction devices capable of mechanical stirring or the like, you may utilize fluid materials to control flowability of catalysts. The fluid materials may include, but not limited to, inorganic materials such as ceramic balls, and carbon materials such as CNFs, carbon black, acetylene black, carbon fibers, graphite, and graphene.

The CNFs produced by the process according to an embodiment may preferably exclude the active species and the carrier to increase the purity. Removing the active species and the carrier may be achieved by, for instance, a method comprising the steps of dispersing CNFs into an acid such as hydrochloric acid, nitric acid, and sulfuric acid; and then withdrawing the CNFs by filtration or centrifugation or the like. The method is disclosed in conventional documents such as Japanese Patent Publication No. 2006-069850 A.

CNFs

The catalyst and the conditions according to an embodiment can provide CNFs that have high dispersibility. The phrase "high dispersibility" may mean, in the present specification, that the present CNF have dispersibility which is relatively higher than those of conventional CNFs or is equal to or higher than a threshold value defined according to the present invention, without being subjected to a dispersing process.

You may evaluate the dispersibility by any methods such as particle size distribution measurements, grind gauge, Turbi online (trade name, manufactured by EKO Instruments), sedimentation tests, and centrifugal sedimentation tests. The particle size distribution measurements may be preferred. Pretreatments and measurements for the dispersibility evaluation may vary depending on factors such as methods, conditions, and status of devices. You may choose or optimize the factors and compare the present CNF with conventional CNFs that are commercially available or are produced by conventional process other than the present process. The comparisons can reveal a high dispersibility of the present CNFs. The measurement of dispersibility may increase the degree of accuracy in the laser diffraction/scattering method according to ISO 13320:2009 using a test for a particle size distribution measurement device, which is explained in detail later.

According to the measurement above, the CNFs obtained from the process according to an embodiment may have 50 vol % or more, preferably 60 vol % or more, more preferably 70 vol % or more of particles having the size equal to or less than 1 µm in aqueous dispersion. According to the measurement above, the present CNFs may also have the median diameter D50 of 3 µm or less, preferably 1.5 µm or less, more preferably 0.5 µm or less, on the basis of volume. It shall mean that the present CNFs have high dispersibility.

In embodiments of the present invention, the term "dispersing treatment" includes a mechanical dispersing or grinding treatment such as a treatment using mechanical homogenizers, bead mills, or emulsifying dispersers, and a strong ultrasonic irradiation treatment using ultrasonic homogenizers or ultrasonic dispersing devices.

Note that the "dispersing treatment" excludes a slurrying or suspending or homogenizing treatment at the rate of 500 rpm or less for 60 minutes or less, such as those using a magnetic stirrer. In other words, the "dispersing treatment" shall exclude the slurrying or suspending or homogenizing treatments at the rate of 300 rpm for about 30 minutes to remove magnesium oxide or active species from CNFs by a magnetic stirrer in the cases that the catalytic activity was less than 3 [(grams of CNF)/{(grams of catalyst) hour}], which was done in some of the present examples. The "dispersing treatment" shall also exclude the grinding process in an agate mortar for crude particles, which are shown in the present examples.

Note also that the "dispersing treatment" excludes pretreatments for dispersibility measurements. In other words, the "dispersing treatment" shall exclude slurrying or suspending or homogenizing (pre)treatments for a short time period by an ultrasonic homogenizer, or by an ultrasonic device essentially equipped in a particle size analyzer, prior to measurements of the ratio of dispersed particles of 1 µm or less and median diameter according to the present embodiments.

CNFs, which are manufactured according to the present embodiments, can have dispersibility higher than the conventional CNFs even under the same pretreatments, and can also satisfy the requirement for dispersibility according to the present embodiments.

The catalyst and the manufacturing conditions according to the present embodiments can also produce CNFs that have high crystallinity as well as high dispersibility. Specifically, the present embodiments may produce CNFs having the D/G value (D/G area ratio) in the range of 0.5 to 1.5 measured by Raman spectrometry. The D/G value or D/G area ratio can be calculated as the ratio between the total area derived from D-band peak(s) and the total area derived from G-band peak(s) in Raman spectrometry for CNF powder. The lower the D/G value is, the higher the crystallinity and conductivity of the CNF are. If the D/G value of CNF, which may be calculated from the result of Raman spectrometry, is less than 0.5, the CNF is difficult to have high activity. If the D/G value is more than 1.5, the CNF may have poor crystallinity.

The catalyst and the manufacturing condition for the process according to the present embodiments may produce a CNF having a high degree of conductivity, i.e., a low degree of volume resistivity. Specifically, the present process may produce a CNF having the volume resistivity of 0.05Ω·cm or less measured under a load of 9.8 MPa.

The present CNF obtained by an embodiment may have 50 vol % or more of particles having the size of 1 µm or less and 3 µm or less of median diameter D50, in the particle size distribution as dispersed in water, without a dispersing treatment. The particle size distribution of the CNFs in an aqueous dispersion may preferably have 60 vol % or more, more preferably 70 vol % or more of particles having the size of 1 µm or less. The particle size distribution of the CNFs may preferably have median diameter D50 of 1.5 µm or less, more preferably 0.5 µm or less. The present CNF may have any specific surface area, preferably 50 to 300 $m^2/g$, more preferably 70 to 200 $m^2/g$. If the particle size distribution of CNFs has the median diameter D50 more than 3 µm, the CNFs may have poor dispersibility.

EXAMPLES

The present invention is further explained with referring to the following working examples. Note that the examples are not intended to limit the present invention.

Magnesium Oxide-supported Cobalt Catalyst

Catalyst Preparation Example 1

6.17 grams of cobalt nitrate hexahydrate (3N5 manufactured by Kanto Chemical Co., Inc.) was dissolved into 30 grams of solvent mixture (distilled water:ethanol=2:1 by mass) to obtain cobalt nitrate solution. The cobalt nitrate solution was added 2.5 grams of magnesium oxide (DENMAG™ KMAOH-F manufactured by Tateho Chemical Industries Co., Ltd.; the specific surface area=0.61 $m^2/g$), and stirred for 1 hour in a hot water bath at 50 degrees C. After that the solution was evaporated by an evaporator. The resulted solid was dried in vacuo at 60 degrees C. for 24 hours, and then calcined at 400 degrees C. for 5 hours. The calcined solid was ground in an agate mortar to obtain a magnesium oxide-supported cobalt catalyst in which the amount of the supported metal cobalt was 50% by mass.

Catalyst Preparation Example 2

A magnesium oxide-supported cobalt catalyst (the carrying rate of cobalt=50% by mass) was obtained in the same manner as Catalyst Preparation Example 1, except that the magnesium oxide was replaced with 2.5 grams of magnesium oxide having the specific surface area of 2.03 m$^2$/g (SMO-1 manufactured by Sakai Chemical Industry Co., Ltd.).

Catalyst Preparation Example 3

A magnesium oxide-supported cobalt catalyst (the carrying rate of cobalt=5% by mass) was obtained in the same manner as Catalyst Preparation Example 1, except that the amount of the cobalt nitrate hexahydrate was 0.62 gram.

Catalyst Preparation Example 4

A magnesium oxide-supported cobalt catalyst (the carrying rate of cobalt=30% by mass) was obtained in the same manner as Catalyst Preparation Example 1, except that the amount of the cobalt nitrate hexahydrate was 3.70 grams.

Catalyst Preparation Example 5

A magnesium oxide-supported cobalt catalyst (the carrying rate of cobalt=80% by mass) was obtained in the same manner as Catalyst Preparation Example 1, except that the amount of the cobalt nitrate hexahydrate was 9.88 grams.

Catalyst Preparation Example 6

A magnesium oxide-supported cobalt catalyst (the carrying rate of cobalt=50% by mass) was obtained in the same manner as Catalyst Preparation Example 1, except that the magnesium oxide was replaced with 2.5 grams of magnesium oxide having the specific surface area of 0.05 m$^2$/g (DENMAG™ KMAO-H manufactured by Tateho Chemical Industries Co., Ltd.).

Cobalt/magnesium Oxide Coprecipitation Catalyst

Catalyst Preparation Example 7

As a catalyst other than the supported catalysts, a coprecipitation catalyst was prepared from cobalt oxide and magnesium oxide by the following process according to Japanese Patent No. 5003923 B2. First, 5.75 grams (0.02 mol) of cobalt nitrate [Co(NO$_3$)$_2$.6H$_2$O; molecular weight (MW): 291.03] and 5.10 grams (0.02 mol) of magnesium nitrate [Mg(NO$_3$)$_2$.6H$_2$O; MW: 256.41] were dissolved into 25 mL of deionized water to prepare Source solution 1. Next, 11 grams (0.139 mol) of ammonium bicarbonate [(NH$_4$)HCO$_3$; MW: 79.06] powder was dissolved into 55 mL of deionized water to prepare Source solution 2. Then Source solution 1 and Source solution 2 were mixed at the reaction temperature of 40 degrees C., and stirred for 4 hours. The resulted precipitate was filtrated, washed, and dried. The dried product was sintered. The sintered product was ground in a mortar to obtain 2.48 grams of a catalyst.

Cobalt Oxide/magnesium Oxide Mixture Catalyst

Catalyst Preparation Example 8

5 mg of cobalt nano particles ("cobalt nano powder APS 5-15 nm" manufactured by Alfa Aesar) and 100 mg of magnesium oxide (SMO-5 manufactured by Sakai Chemical Industry Co., Ltd.; the specific surface area=0.35 m$^2$/g) were mixed in a mortar to obtain a mixture catalyst which is different from the supported catalysts.

Removing Carriers from Synthesized CNFs

Synthesized CNFs include magnesium oxide used as a carrier and an active species. If the synthetic activity is less than 3[(grams of CNF)/{(grams of catalyst)·hour}], the CNFs contain high amounts of magnesium oxide and active species that may affect the conductivity and dispersibility of the CNFs, and have to be removed magnesium oxide and active species therefrom.

First, 1.0 gram of synthesized CNFs was put into 200 mL of 2 mol/L hydrochloric acid solution. The solution was dispersed and homogenized at 300 rpm for 30 minutes using a magnetic stirrer. Then the CNFs was filtrated and washed until the pH reached neutral. The resulted CNFs was dried in a vacuum heating dryer at 80 to 100 degrees C. for 24 hours or more. Since the dried CNFs contained some crude particles, the CNFs were ground in an agate mortar until the CNFs passed through an 1 mm mesh sieve.

After removing magnesium oxide and active species, the resulted CNFs were subjected to measurements of the volume resistivity, the specific surface area, the ratio of dispersed particles having the size of 1 μm or less, and the median diameter D50.

Measurement of Specific Surface Area

The specific surface area of CNF powder was measured by a BET one-point method according to JIS K6217-2 using Macsorb HM model-1201 (manufactured by Mountech).

Measurement of Volume Resistivity

The volume resistivity of CNF powder was measured by a four-point probe method at 23 degrees C., in an atmosphere of 50% relative humidity, under a load of 9.8 MPa, using a powder resistivity measurement system (Loresta GP MCP-PD51 manufactured by Mitsubishi Chemical Analytech). The measurement used 100 mg of the sample.

Raman Spectrometry

A Raman spectrometry for CNF powder was carried out by a microscopic laser Raman spectroscopic analyzer (Niolet Almega-XR manufactured by Thermo Fisher Scientific; laser: 532 nm). The peaks in D-band (D1: peak 1330 cm$^{-1}$, D3: 1500 cm$^{-1}$, D4: 1150 cm$^{-1}$) and those in G-band (G+: 1600 cm$^{-1}$, G−: 1570 cm$^{1}$) were separated. Then the ratio (i.e., D/G value) between the total area derived from the D-band peaks and the total area derived from the G-band peaks was calculated. The lower the D/G value, the higher the crystallinity of CNF. If the D/G value is less than 0.5, the CNF is difficult to have high activity.

NOTE:

D1: derived from point defects in graphite crystal structure or defects at crystal edges
D3: derived from amorphous carbon
D4: derived from polyenes or ionic impurities
G+: crystalline peak of graphite, longitudinal optical mode
G−: crystalline peak of graphite, lateral optical mode Measurements of Ratio of Dispersed Particles of 1 μm or less and Median Diameter D50 (Particle Distribution Measurements)

The ratio of dispersed particles of 1 μm or less and the median diameter D50 were measured by a particle distribution measurement device (LS 13 320 Universal Liquid Module, manufactured by BECKMAN COULTER).

Prior to the measurements of the ratio of dispersed particles of 1 μm or less and the median diameter D50, the particle distribution measurement device had been calibrated as following. The device was accepted to carry out the actual measurements for the examples and comparative examples if the median diameter D50 of the following test samples meets all the following conditions.

Preparation of Aqueous Dispersion Medium 0.10 gram of sodium carboxymethyl cellulose (hereinafter referred to as "CMCNa") was added to 100 mL of distilled water, and the mixture was stirred at room temperature for 24 hours or more to dissolve CMCNa and prepare an aqueous dispersion medium containing 0.1% by mass of CMCNa.

Preparation of CMCNa Solution 2.0 grams of sodium carboxymethyl cellulose was added to 100 mL of distilled water, and the mixture was stirred at room temperature for 24 hours or more to prepare an aqueous solution of 2.0% by mass of CMCNa.

Preparation of Test Samples and Calibrations

1. Test Using Polystyrene Dispersion Liquid

An aqueous dispersion liquid (LATRON 300LS; median diameter D50=0.297 µm) was used for the test. The liquid had been attached to the particle distribution measurement device (LS 13 320 Universal Liquid Module, manufactured by BECKMAN COULTER).

An optical model was set to the refractive indices of polystyrene (1.6) and water (1.333), respectively. A module was washed and filled with around 1.0 mL of the CMCNa solution. An offset measurement, optical axis adjustment, and background measurement were carried out with a pump speed of 50%. After that, LATRON 300LS was poured into the particle distribution measurement device such that the relative concentration which indicates the percentage of light scattered outside the beam by the particles was 8 to 12%, or the PIDS was 40 to 55%. Then the particle size distribution was measured to obtain a graph of size versus volume %. The value of the resulted median diameter D50 fell within 0.297 µm±0.018 µm, the value of D10 fell within 0.245 µm±0.024 µm, and the value of D90 fell within 0.360 µm±0.036 µm. The measurement accuracy was thus confirmed.

2. Test Using Alumina Dispersion Liquid

A vial was added 0.120 gram of alumina ("LS-13" manufactured by Denka Co. Ltd.; median diameter D50=45 µm), 0.120 gram of alumina ("AS-50" manufactured by Showa Denko K.K.; median diameter D50=6.7 µm), and 12.0 grams of the aqueous dispersion medium. The vial was shaken to prepare an alumina dispersion liquid.

An optical model was set to the refractive indices of alumina (1.768) and water (1.333), respectively. A module was washed and filled with around 1.0 mL of the CMCNa solution. An offset measurement, optical axis adjustment, and background measurement were carried out with a pump speed of 50%. After that, the alumina dispersion liquid was poured into the particle distribution measurement device such that the relative concentration which indicates the percentage of light scattered outside the beam by the particles was 8 to 12%, or the PIDS was 40 to 55%. Then the particle size distribution was measured to obtain a graph of size versus volume %. The value of the resulted median diameter D50 fell within 48.8 µm±5.0 µm for LS-13 and 12.6 µm±0.75 µm for AS-50. The measurement accuracy was thus confirmed.

Pretreatments before Measurements

A vial was added 6.0 mg of CNF and 6.0 grams of the aqueous dispersion medium. Pretreatments were performed by an ultrasonic homogenizer (SmurtNR-50 manufactured by Microtec Co. Ltd; output: 50 W). The homogenizer equipped at the end a vibration tip which had not been deteriorated. The tip was dipped in the sample liquid such that the tip was immersed in 10 mm or more from the liquid surface. The tip to be used had operated for 30 minutes or less to generate ultrasonic waves. The parameters "TIME SET" (i.e., irradiation time period), "POW SET," and "START POW" were set to 40 seconds, 50%, and 50% (output: 50%), respectively. The homogenizer operated in auto power mode in which the output voltage was constant to irradiate ultrasonic waves to prepare a homogenized aqueous CNF dispersion.

Particle Size Distribution Measurements for CNFs

The ratio of dispersed particles of 1 µm or less and the median diameter D50 of CNFs were measured by the following method using the aqueous CNF dispersion. An optical model of LS 13 320 Universal Liquid Module was set to the refractive indices of CNF (1.520) and water (1.333), respectively. A module was washed and filled with around 1.0 mL of the CMCNa solution. An offset measurement, optical axis adjustment, and background measurement were carried out with a pump speed of 50%. After that, the prepared aqueous CNF dispersion was poured into the particle distribution measurement device such that the relative concentration which indicates the percentage of light scattered outside the beam by the particles was 8 to 12%, or the PIDS was 40 to 55%. An apparatus attached in the particle distribution measurement device irradiated ultrasonic waves at 78 W for 2 minutes as a pretreatment. The CNF dispersion was circulated for 30 seconds to purge bubbles, and then subjected to a measurement of particle size distribution to obtain a graph of size versus volume %. The ratio of dispersed particles of 1 µm or less and the median diameter D50 of CNFs were obtained.

The particle size distribution measurement was performed three times per one example of CNF, with collecting each test sample from different places. The ratio of dispersed particles of 1 µm or less and the median diameter D50 were calculated from the average values of the three samples, respectively.

Synthetic Reactor for CNFs

Figure 1:
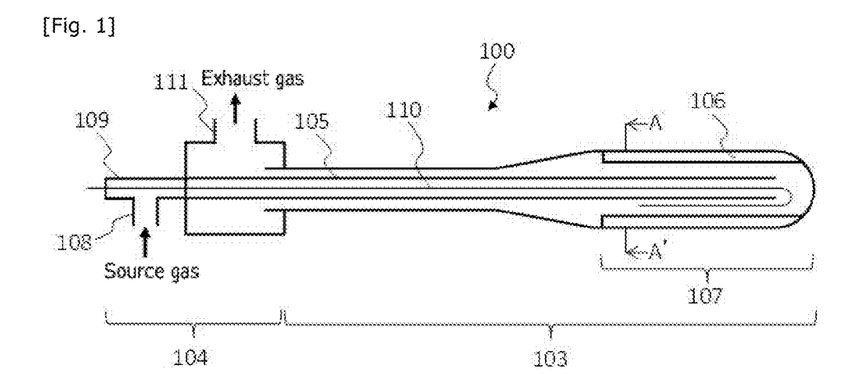
FIG. 1 illustrates a schematic view of a horizontal rotary reactor used in the present Examples.
Figure 2:
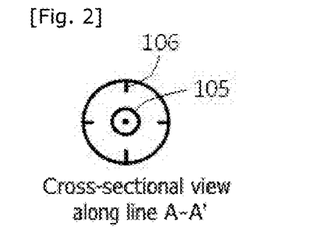
FIG. 2 illustrates a cross-sectional view along line A-A' of FIG. 1.
Figure 3:
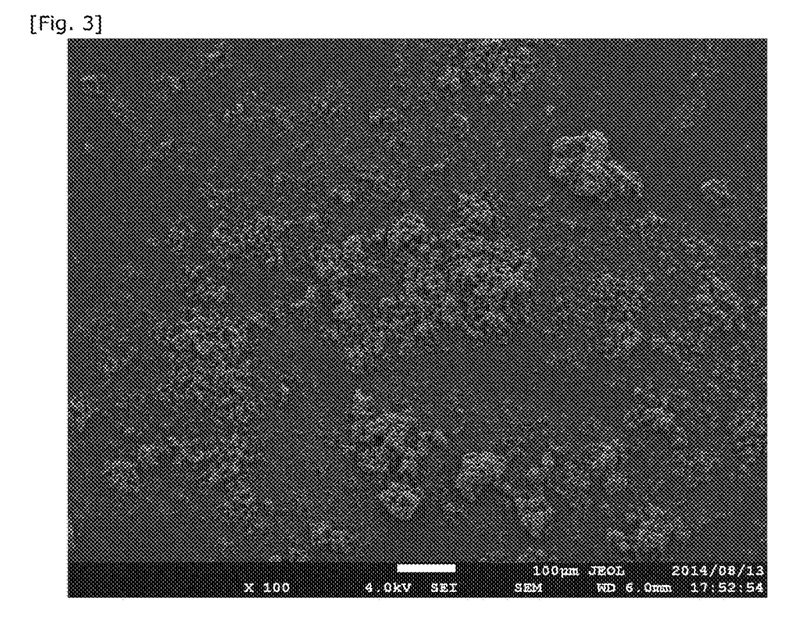
FIG. 3 illustrates an SEM photograph of the CNF synthesized in Example 1.
Figure 4:
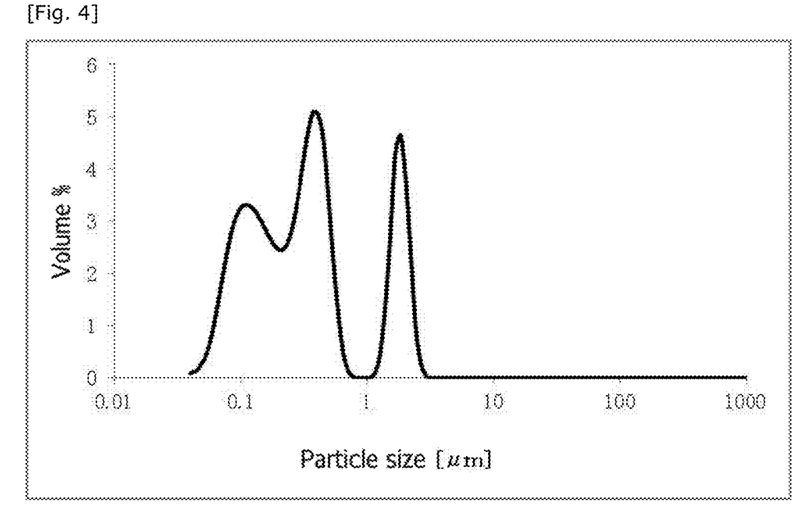
FIG. 4 illustrates a particle size distribution diagram of the CNF synthesized in Example 1.
Figure 5:
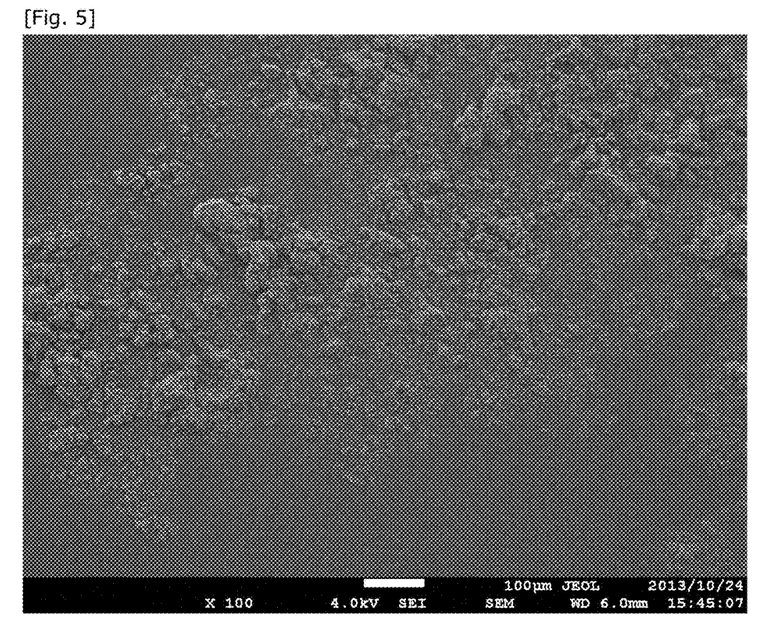
FIG. 5 illustrates an SEM photograph of the CNF synthesized in comparative example 3.
Figure 6:
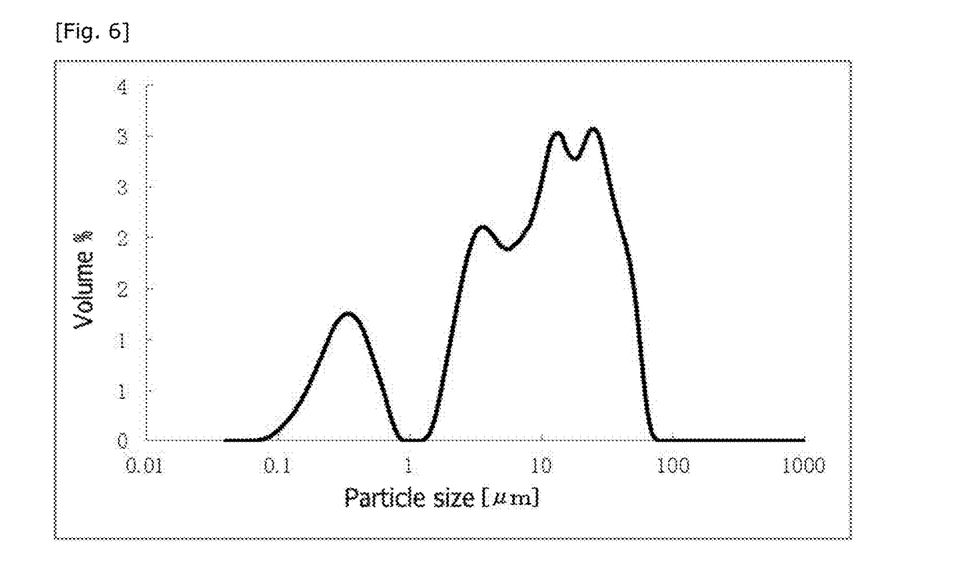
FIG. 6 illustrates a particle size distribution diagram of the CNF synthesized in comparative example 3.

FIG. 1 illustrates a schematic diagram of horizontal rotary reactor 100. Reactor 100 connects with a commercially available rotary evaporator (N-1110V manufactured by TOKYO RIKAKIKAI Co., Ltd.) to carry out reactions batch-wise. Reactor 100 includes fixed part 104 (non-rotatable, made from Pyrex™ glass) and rotatable part 103 (cylindrical shape, made from quartz glass). There is a non-rotatable gas inlet part 105 (tubular shape, 12 mm diameter) at the center of reactor 100. The gas inlet part 105 connects with fixed part 104. The rotatable 103 has reaction part 107 (about 20 cm length, 5 cm diameter) at the tip. The reaction part 107 has agitating blades 106 on the inner wall of the cylindrical part. The agitating blades 106 are shown in FIG. 2, the cross-sectional view along line A-A'. The fixed part 104 connects with gas inlet 108 and thermocouple introduction pipe 109. The gas inlet 108 is installed at gas inlet part 105 perpendicularly. The thermocouple introduction pipe 109 is installed at gas inlet part 105 parallelly. The thermocouple introduction pipe 109 introduce thermocouple 110 into gas inlet part 105. The thermocouple 110 bends by 180 degrees at the outside of the exit of gas inlet part 105. The measuring part of thermocouple 110 measures the temperature in the inside of reaction part 107 at the outside of gas inlet part 105. The thermocouple 110 includes three thermocouples that measure the temperatures at the center, the rightmost edge, and the leftmost edge of reaction part 107, respectively. The reaction part 107 is uniformly heated by independently controlling three electric furnaces included in a three-zone horizontal tubular electric furnace (not shown) located on the periphery of reaction part 107.

The periphery of fixed part 104 connects with gas exhaust pipe 111 to discharge gas from reaction part 107.

The reaction was carried out by the following steps. A certain amount of catalyst was set in reaction part 107 in reactor 100. The reactor 100 was horizontal or slightly tilted such that the reaction part 107 went downward. The reaction progressed with a source gas being introduced from gas inlet 108 toward gas inlet part 105 and reaction part 107, and exhausted from gas outlet 111, and with the rotatable part 103 rotating at a certain rate.

Synthesis of CNFs

Example 1

The catalyst (magnesium oxide-supported cobalt catalyst) obtained in Catalyst Preparation Example 1 was put into a reactor such that the amount of the cobalt metal active species was 190 mg. The rotatable portion of the reactor was rotated at 30 rpm, and nitrogen gas flowed at room temperature and normal pressure to purge the interior of the reactor. After that the reactor was heated gradually, and when the temperature reached 605 degrees C. (i.e., the reaction temperature minus 50 degrees C.), the gas flow was switched from the nitrogen gas to a reducing gas containing 30% of nitrogen and 70% of hydrogen at normal pressure. The flow rate of the reducing gas was 233 mL/minute for nitrogen and 543 mL/minute for hydrogen, as the real flow rate. After that the temperature reached 655 degrees C. (i.e., the reaction temperature) and 20 minutes passed since the reducing gas started flowing, the reducing gas was stopped. Then a source gas containing 85% of carbon monoxide and 15% of hydrogen flowed at 0.1 MPa (atmospheric pressure) into the system. The flow rate for the carbon monoxide gas was 3.3 [NL/{(grams of active species)·minute}] and that for the hydrogen gas was 0.58 [NL/{(grams of active species)·minute}] at normal pressure. The reactor was maintained at 655 degrees C. and the reaction proceeded for 60 minutes. After that the source gas was stopped, and the reactor was purged and cooled down with nitrogen gas. The synthetic activity was calculated from the mass of the obtained CNF, the mass of the used active species, and the reaction period. The catalytic activity was calculated from the mass of the obtained CNF, the mass of the used catalyst, and the reaction period. The obtained CNF was further subjected to Raman spectrometry to measure the D/G value. The volume resistivity, the specific surface area, the ratio of dispersed particles, and the median diameter D50 were also measured. The results were shown in Tables 1 and 2. Note that, since the catalytic activity was equal to or more than 3 [(grams of CNF)/{(grams of catalyst)·hour}] after the synthesis, the carrier was not removed.

TABLE 1

| | Catalyst type | | | | | | | partial pressure of carbon monoxide gas [MPa] | flow rate of carbon monoxide gas [†1] | synthetic activity [†2] | catalytic activity [†3] |
|---|---|---|---|---|---|---|---|---|---|---|---|
| | used catalyst | active species | carrier | specific surface area of carrier [m²/g] | carrying rate [%] | reaction temperature [° C.] | reaction period [min.] | source gas (mole ratio) | | | | |
| Example 1 | Catalyst Preparation Example 1 | cobolt | magnesium oxide | 0.61 | 50 | 655 | 60 | CO:H2:N2 = 85:15:0 | 0.86 | 3.3 | 23 | 7 |
| Example 2 | Catalyst Preparation Example 6 | cobolt | magnesium oxide | 0.05 | 50 | 655 | 30 | CO:H2:N2 = 85:15:0 | 0.86 | 0.85 | 4.3 | 1.3 |
| Example 3 | Catalyst Preparation Example 2 | cobolt | magnesium oxide | 2.03 | 50 | 655 | 30 | CO:H2:N2 = 85:15:0 | 0.86 | 0.85 | 3.9 | 1.2 |
| Example 4 | Catalyst Preparation Example 3 | cobolt | magnesium oxide | 0.61 | 5 | 655 | 30 | CO:H2:N2 = 85:15:0 | 0.86 | 0.85 | 2.5 | 0.1 |
| Example 5 | Catalyst Preparation Example 4 | cobolt | magnesium oxide | 0.61 | 30 | 655 | 30 | CO:H2:N2 = 85:15:0 | 0.86 | 0.85 | 3.9 | 0.8 |
| Example 6 | Catalyst Preparation Example 1 | cobolt | magnesium oxide | 0.61 | 50 | 655 | 30 | CO:H2:N2 = 85:15:0 | 0.86 | 0.85 | 3.1 | 1.0 |
| Example 7 | Catalyst Preparation Example 5 | cobolt | magnesium oxide | 0.61 | 80 | 655 | 30 | CO:H2:N2 = 85:15:0 | 0.86 | 0.85 | 5.9 | 2.3 |
| Example 8 | Catalyst Preparation Example 1 | cobolt | magnesium oxide | 0.61 | 50 | 655 | 30 | CO:H2:N2 = 40:7:53 | 0.04 | 0.85 | 0.74 | 2.4 |
| Example 9 | Catalyst Preparation Example 1 | cobolt | magnesium oxide | 0.61 | 50 | 610 | 30 | CO:H2:N2 = 85:15:0 | 0.86 | 0.85 | 5 | |

†1: the unit is [NL/{(grams of active species) · minute}]  †2: the unit is [(grams of CNF)/{(grams of active species) · hour}]
†3: the unit is [(grams of CNF)/{(grams of catalyst) · hour}]

TABLE 2

| | Catalyst type | | | | | | | dispersed particles having the size of 1 μm or less [vol %] | median diameter [μm] |
|---|---|---|---|---|---|---|---|---|---|
| | used catalyst | active species | carrier | specific surface area of carrier [m²/g] | carrying rate [%] | volume resistivity [Ω · cm] | specific surface area [m2/g] | D/G area ratio | |
| Example 1 | Catalyst Preparation Example 1 | cobalt | magnesium oxide | 0.61 | 50 | 0.023 | 136 | 0.88 | 70 | 0.35 |
| Example 2 | Catalyst Preparation Example 6 | cobalt | magnesium oxide | 0.05 | 50 | 0.034 | 137 | 1.12 | 81 | 0.39 |
| Example 3 | Catalyst Preparation Example 2 | cobalt | magnesium oxide | 2.03 | 50 | 0.026 | 140 | 1.00 | 79 | 0.33 |
| Example 4 | Catalyst Preparation Example 3 | cobalt | magnesium oxide | 0.61 | 5 | 0.040 | 154 | 1.42 | 77 | 0.37 |
| Example 5 | Catalyst Preparation Example 4 | cobalt | magnesium oxide | 0.61 | 30 | 0.042 | 143 | 0.97 | 89 | 0.28 |
| Example 6 | Catalyst Preparation Example 1 | cobalt | magnesium oxide | 0.61 | 50 | 0.025 | 128 | 0.98 | 86 | 0.24 |
| Example 7 | Catalyst Preparation Example 5 | cobalt | magnesium oxide | 0.61 | 80 | 0.024 | 132 | 0.93 | 100 | 0.1 |
| Example 8 | Catalyst Preparation Example 1 | cobalt | magnesium oxide | 0.61 | 50 | 0.024 | 137 | 1.06 | 80 | 0.46 |
| Example 9 | Catalyst Preparation Example 1 | cobalt | magnesium oxide | 0.61 | 50 | 0.027 | 150 | 1.22 | 82 | 0.3 |

Example 2

A CNF was synthesized in the same manner as Example 1, except that the catalyst obtained in Catalyst Preparation Example 6 was prepared such that the amount of the active species was 306 mg; the real flow rate of the reducing gas was 375 mL/minute for nitrogen and 875 mL/minute for hydrogen; the flow rates of carbon monoxide gas and hydrogen gas were 0.85 [NL/{(grams of active species)·minute}] and 0.15 [NL/{(grams of active species)·minute}], respectively; and the reaction period was 30 minutes. The synthetic activity and the catalytic activity were calculated and the D/G value was obtained from Raman spectrometry in the same manner as the Example 1. Since the catalytic activity was less than 3 [(grams of CNF)/{(grams of catalyst)·hour}] after the synthesis, the carrier was removed from the resulted product, and then the product was subject to measurements of the volume resistivity, the specific surface area, the ratio of dispersed particles, and the median diameter D50. The results were shown in Tables 1 and 2.

Example 3

A CNF was synthesized in the same manner as Example 2, except that the catalyst according to Catalyst Preparation Example 2 was used. The synthetic activity and the catalytic activity were calculated and the D/G value was obtained from Raman spectrometry in the same manner as the Example 1. Since the catalytic activity was less than 3 [(grams of CNF)/{(grams of catalyst)·hour}] after the synthesis, the carrier was removed from the resulted product, and then the product was subject to measurements of the volume resistivity, the specific surface area, the ratio of dispersed particles, and the median diameter D50. The results were shown in Tables 1 and 2.

Example 4

A CNF was synthesized in the same manner as Example 2, except that the catalyst according to Catalyst Preparation Example 3 was used. The synthetic activity and the catalytic activity were calculated and the D/G value was obtained from Raman spectrometry in the same manner as the Example 1. Since the catalytic activity was less than 3 [(grams of CNF)/{(grams of catalyst)·hour}] after the synthesis, the carrier was removed from the resulted product, and then the product was subject to measurements of the volume resistivity, the specific surface area, the ratio of dispersed particles, and the median diameter D50. The results were shown in Tables 1 and 2.

Example 5

A CNF was synthesized in the same manner as Example 2, except that the catalyst obtained in Catalyst Preparation Example 4 was prepared such that the amount of the active species was 372 mg; and the real flow rate of the reducing gas was 233 mL/minute for nitrogen and 543 mL/minute for hydrogen. The synthetic activity and the catalytic activity were calculated and the D/G value was obtained from Raman spectrometry in the same manner as the Example 1. Since the catalytic activity was less than 3 [(grams of CNF)/{(grams of catalyst)·hour}] after the synthesis, the carrier was removed from the resulted product, and then the product was subject to measurements of the volume resis-

Example 6

A CNF was synthesized in the same manner as Example 2, except that the catalyst obtained in Catalyst Preparation Example 1 was prepared such that the amount of the active species was 306 mg. The synthetic activity and the catalytic activity were calculated and the D/G value was obtained from Raman spectrometry in the same manner as the Example 1. Since the catalytic activity was less than 3 [(grams of CNF)/{(grams of catalyst)·hour}] after the synthesis, the carrier was removed from the resulted product, and then the product was subject to measurements of the volume resistivity, the specific surface area, the ratio of dispersed particles, and the median diameter D50. The results were shown in Tables 1 and 2.

Example 7

A CNF was synthesized in the same manner as Example 2, except that the catalyst obtained in Catalyst Preparation Example 5 was prepared such that the amount of the active species was 372 mg; and the reaction period was 60 minutes. The synthetic activity and the catalytic activity were calculated and the D/G value was obtained from Raman spectrometry in the same manner as the Example 1. Since the catalytic activity was less than 3 [(grams of CNF)/{(grams of catalyst)·hour}] after the synthesis, the carrier was removed from the resulted product, and then the product was subject to measurements of the volume resistivity, the specific surface area, the ratio of dispersed particles, and the median diameter D50. The results were shown in Tables 1 and 2.

Example 8

A CNF was synthesized in the same manner as Example 1, except that the real flow rate of the reducing gas was 428 mL/minute for nitrogen and 1000 mL/minute for hydrogen; the source gas contains 40% of carbon monoxide, 7% of hydrogen, and 53% of nitrogen; the flow rates of carbon monoxide gas, hydrogen gas, and nitrogen gas were 0.85 [NL/{(grams of active species) minute}], 0.15 [NL/{(grams of active species)·minute}], and 1.1 [NL/{(grams of active species)·minute}], respectively; and the reaction period was 30 minutes. The synthetic activity and the catalytic activity were calculated and the D/G value was obtained from Raman spectrometry in the same manner as the Example 1. Since the catalytic activity was less than 3 [(grams of CNF)/{(grams of catalyst)·hour}] after the synthesis, the carrier was removed from the resulted product, and then the product was subject to measurements of the volume resistivity, the specific surface area, the ratio of dispersed particles, and the median diameter D50. The results were shown in Tables 1 and 2.

Example 9

A CNF was synthesized in the same manner as Example 2, except that the catalyst according to Catalyst Preparation Example 1 was used; and the reaction temperature was 610 degrees C. The synthetic activity and the catalytic activity were calculated and the D/G value was obtained from Raman spectrometry in the same manner as the Example 1. Since the catalytic activity was less than 3 [(grams of CNF)/{(grams of catalyst)·hour}] after the synthesis, the carrier was removed from the resulted product, and then the product was subject to measurements of the volume resistivity, the specific surface area, the ratio of dispersed particles, and the median diameter D50. The results were shown in Tables 1 and 2.

Comparative Example 1

A CNF was synthesized in the same manner as Example 1, except that the reaction temperature was 550 degrees C. which is out of the scope of the process according to the present embodiments. The synthetic activity and the catalytic activity were calculated and the D/G value, the volume resistivity, and the specific surface area were determined in the same manner as the Example 1. The results were shown in Tables 3 and 4. Since the obtained CNF had too poor dispersibility, the pretreatment according to the present embodiment was not able to homogenize or disperse the CNF. Thus the CNF was not subjected to a measurement of particle size distribution. The catalytic activity was equal to or more than 3 [(grams of CNF) / {(grams of catalyst) ·hour}]after the synthesis, the carrier was not removed.

TABLE 3

| comparative example # | Catalyst type | | | | | | | | | | |
|---|---|---|---|---|---|---|---|---|---|---|---|
| | used catalyst | active species | carrier | specific surface area of carrier [m²/g] | carrying rate [%] | reaction temperature [° C.] | reaction period [min.] | source gas (mole ratio) | partial pressure of carbon monoxide gas [MPa] | flow rate of carbon monoxide gas [†1] | synthetic activity [†2] | catalytic activity [†3] |
| comp. ex. 1 | Catalyst Preparation Example 1 | cobalt | magnesium oxide | 0.61 | 50 | 550 | 60 | CO:H2:N2 = 85:15:0 | 0.086 | 3.3 | 30.3 | 9.3 |
| comp. ex. 2 | Catalyst Preparation Example 1 | cobalt | magnesium oxide | 0.61 | 50 | 655 | 30 | CO:H2:N2 = 85:15:0 | 0.086 | 30 | 68 | 20 |
| comp. ex. 3 | Catalyst Preparation Example 7 | cobalt/magnesium oxide coprecipitation catalyst | | | | 655 | 60 | CO:H2:N2 = 85:15:0 | 0.086 | 0.85 | 28 | 14 |
| comp. ex. 4 | Catalyst Preparation Example 8 | cobalt/magnesium oxide mixture catalyst | | | | 655 | 60 | CO:H2:N2 = 85:15:0 | 0.086 | 0.85 | 1 | 0 |

TABLE 3-continued

| comparative example # | Catalyst type | | | | | | | | | | |
|---|---|---|---|---|---|---|---|---|---|---|---|
| | used catalyst | active species | carrier | specific surface area of carrier [m²/g] | carrying rate [%] | reaction temperature [° C.] | reaction period [min.] | source gas (mole ratio) | partial pressure of carbon monoxide gas [MPa] | flow rate of carbon monoxide gas [†1] | synthetic activity [†2] | catalytic activity [†3] |
| comp. ex. 5 | commercially available CNF | | | — | — | — | — | — | — | — | — |

†1: the unit is [NL/{(grams of active species) · minute}] †2: the unit is [(grams of CNF)/{(grams of active species) · hour}]
†3: the unit is [(grams of CNF)/{(grams of catalyst) · hour}]

TABLE 4

| comparative example # | Catalyst type | | | | carrying rate [%] | volume resistivity [Ω · cm] | specific surface area [m2/g] | D/G area ratio | median diameter [µm] | dispersed particles having the size of 1 µm or less [vol %] |
|---|---|---|---|---|---|---|---|---|---|---|
| | used catalyst | active species | carrier | specific surface area of carrier [m²/g] | | | | | | |
| comp. ex. 1 | Catalyst Preparation Example 1 | cobalt | magnesium oxide | 0.61 | 50 | 0.060 | 194 | 1.77 | — | — |
| comp. ex. 2 | Catalyst Preparation Example 1 | cobalt | magnesium oxide | 0.61 | 50 | 0.015 | 147 | 1.1 | 17 | 2.7 |
| comp. ex. 3 | Catalyst Preparation Example 7 | cobalt/magnesium oxide coprecipitation catalyst | | | | 0.038 | 297 | 1.5 | 10 | 16.2 |
| comp. ex. 4 | Catalyst Preparation Example 8 | cobalt/magnesium oxide mixture catalyst | | | | — | — | — | — | — |
| comp. ex. 5 | — | — | — | — | — | 0.023 | 241 | 1.73 | 13 | 13 |

Comparative Example 2

A CNF was synthesized in the same manner as Example 1, except that the flow rates of carbon monoxide gas was 30 [NL/{(grams of active species) minute}] which is beyond the scope of the process according to the present embodiments; the catalyst obtained in Catalyst Preparation Example 1 was prepared such that the amount of the active species was 306 mg; the real flow rate of the reducing gas was 94 mL/minute for nitrogen and 219 mL/minute for hydrogen; and the reaction period was 30 minutes. The synthetic activity and the catalytic activity were calculated and the D/G value, the volume resistivity, the specific surface area, the ratio of dispersed particles, and the median diameter D50 in the same manner as the Example 1. The results were shown in Tables 3 and 4. Since the catalytic activity was equal to or more than 3 [(grams of CNF)/{(grams of catalyst)·hour}] after the synthesis, the carrier was not removed.

Comparative Example 3

A CNF was synthesized in the same manner as Example 1, except that the coprecipitation catalyst obtained in Catalyst Preparation Example 7 was used instead of the magnesium oxide-supported cobalt catalyst according to the present embodiments. The synthetic activity and the catalytic activity were calculated and the D/G value, the volume resistivity, the specific surface area, the ratio of dispersed particles, and the median diameter D50 in the same manner as the Example 1. The results were shown in Tables 3 and 4. Since the catalytic activity was equal to or more than 3 [(grams of CNF)/{(grams of catalyst)·hour}] after the synthesis, the carrier was not removed.

Comparative Example 4

A CNF was produced in the same manner Example 1 except that the magnesium oxide-supported cobalt catalyst was replaced with the mixture catalyst prepared by Catalyst Preparation Example 8. Since the resulted CNF had too low synthetic activity, no measurements were carried out.

Comparative Example 5

A commercially available CNF ("Flotube9000" manufactured by CNano) was used to measure the volume resistivity, the D/G value, the specific surface area, the ratio of dispersed particles, and the median diameter D50. The results are shown in Tables 3 and 4.

Discussion

The CNFs according to Examples 1 to 9 had excellent crystallinity, conductivity, and dispersibility. As illustrated in Examples 1 to 9, the embodiment according to the present invention is able to manufacture CNFs excellent in crystallinity, conductivity, and dispersibility.

In the cases that CNFs were synthesized by the catalyst and reaction conditions according to any of Examples 1 to 9, the dispersibilities of the CNFs were higher than those of comparative examples 1 to 5. Further, the reaction temperature according to any of Examples 1 to 9 provided the CNFs with lower D/G values (i.e., higher crystallinities) with respect to those of comparative examples 1 to 5.

REFERENCE SIGNS LIST

100 Reactor
103 Rotatable part
104 Fixed part
105 Gas inlet part
106 Agitating blade
107 Reaction part
108 Gas inlet
109 Thermocouple introduction pipe
110 Thermocouple
111 Gas outlet

The invention claimed is:

1. A process for producing a carbon nanofiber, the process using a catalyst comprising an active species based on cobalt and a carrier supporting the active species thereon,
wherein the carrier comprises an oxide having a specific surface area of 0.01 to 5 m$^2$/g and containing magnesium,
wherein the process uses carbon monoxide as a carbon source,
wherein a partial pressure for carbon monoxide is 0.04 to 0.98 MPa,
wherein a flow rate for carbon monoxide gas is equal to 0.1 [NL/{(grams of active species)·minute}] or more and less than 6 [NL/{(grams of active species)·minute}], and
wherein a reaction temperature is equal to 570° C. or more and less than 670° C.

2. The process according to claim 1, wherein an amount of the active species supported on the carrier is 3 to 90% by mass on a basis of a mass of the carrier.

3. The process according to claim 1, wherein the produced carbon nanofiber has at least one of the following physical properties:
0.05Ω·cm or less of a volume resistivity measured under a load of 9.8 MPa;
0.5 to 1.5 of D/G;
50 volume % or more of particles, as dispersed in water, having a size of 1 μm or less; and
3 μm or less of median diameter D50 as dispersed in water.

4. The process according to claim 2, wherein the produced carbon nanofiber has at least one of the following physical properties:
0.05Ω·cm or less of a volume resistivity measured under a load of 9.8 MPa;
0.5 to 1.5 of D/G;
50 volume % or more of particles, as dispersed in water, having a size of 1 μm or less; and
3 μm or less of median diameter D50 as dispersed in water.

* * * * *